United States Patent
Das Purkayastha

(10) Patent No.: US 10,564,886 B2
(45) Date of Patent: Feb. 18, 2020

(54) METHODS AND APPARATUS FOR CONTROLLING FLASH TRANSLATION LAYER RECYCLE FROM HOST

(71) Applicant: Western Digital Technologies, Inc., San Jose, CA (US)

(72) Inventor: Saugata Das Purkayastha, Bangalore (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 103 days.

(21) Appl. No.: 15/900,673

(22) Filed: Feb. 20, 2018

(65) Prior Publication Data

US 2019/0258422 A1    Aug. 22, 2019

(51) Int. Cl.
*G06F 3/06* (2006.01)
*G06F 12/10* (2016.01)

(52) U.S. Cl.
CPC .......... *G06F 3/0652* (2013.01); *G06F 3/064* (2013.01); *G06F 3/0604* (2013.01); *G06F 3/0659* (2013.01); *G06F 3/0679* (2013.01); *G06F 12/10* (2013.01); *G06F 2212/1044* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,725,931 B1* | 5/2014 | Kang | G06F 12/0246 710/52 |
| 9,122,586 B2 | 9/2015 | Ma et al. | |
| 9,256,384 B2 | 2/2016 | Bert et al. | |
| 9,329,991 B2 | 5/2016 | Cohen et al. | |
| 9,552,290 B2 | 1/2017 | Baryudin et al. | |
| 2014/0310494 A1* | 10/2014 | Higgins | G11C 16/349 711/167 |
| 2015/0169442 A1* | 6/2015 | Fisher | G06F 12/0253 711/103 |

(Continued)

OTHER PUBLICATIONS

Nishi et al, "NAND Flash Memory-Based SSD Controller Using Full Page-Associative Block Recycling Mechanism", 2011 3rd IEEE Intl Memory Workshop (IMW); May 2011; doi 10.1109/IMW.2011.5873200; http://ieeexplore.ieee.org/document/5873200/; 3 pages.

*Primary Examiner* — Tracy C. Chan
(74) *Attorney, Agent, or Firm* — Loza & Loza, LLP; Gabriel Fitch

(57) ABSTRACT

Aspects of the disclosure provide for control of a flash translation layer (FTL) in a non-volatile memory (NVM). Disclosed methods and apparatus provide for receiving a message in the FTL, which is transmitted from a host device, and includes desired recycle ratio information that is determined by the host where the ratio is a number of host writes to a number of recycle writes to be performed by the FTL. Based on the recycle ratio information, the FTL determines a target recycle ratio and performs recycling of memory blocks in the NVM based on the determined target recycle ratio. In this manner, the host device is able to exert control over the recycle ratio utilized in the FTL via a transmitted message, which allows the recycle ratio to be more adaptive to host write conditions known to the host device, but not known in the SSD.

27 Claims, 7 Drawing Sheets

(56) References Cited

U.S. PATENT DOCUMENTS

| | | | |
|---|---|---|---|
| 2016/0092120 A1* | 3/2016 | Liu | G06F 3/0629 |
| | | | 711/103 |
| 2016/0162416 A1 | 6/2016 | Boyd et al. | |
| 2017/0115932 A1* | 4/2017 | Mitsumasu | G06F 12/0246 |
| 2017/0132125 A1 | 5/2017 | Cai et al. | |
| 2017/0160953 A1* | 6/2017 | Hirata | G06F 3/0611 |
| 2017/0177218 A1* | 6/2017 | Kanno | G06F 3/061 |
| 2017/0285945 A1* | 10/2017 | Kryvaltsevich | G06F 3/061 |
| 2017/0351604 A1* | 12/2017 | Tang | G06F 12/0246 |
| 2018/0173464 A1* | 6/2018 | Wongso | G06F 3/0659 |
| 2018/0336150 A1* | 11/2018 | Jinn | H04W 28/08 |

\* cited by examiner

US 10,564,886 B2

METHODS AND APPARATUS FOR CONTROLLING FLASH TRANSLATION LAYER RECYCLE FROM HOST

FIELD

The present disclosure relates generally to solid state drives (SSDs) including non-volatile memories (NVMs), and more specifically, to methods and apparatus for controlling flash translation layer recycling under the direction of a host device.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories, and the flash memory devices may be logically divided into blocks with each of the blocks further divided into logically addressable pages.

SSD devices typically include an internal controller that contains a Flash Translation Layer (FTL). Among other things, the FTL translates between logical addresses and physical addresses and manages recycling/garbage collection, which is a process including recycling physical blocks in the flash memory devices for data write requests that come from a host device to try to ensure that there are enough free memory blocks for storing the host write data. To this end, the FTL attempts to accurately estimate how much free space will be needed in the flash memory devices as host writes are received and implements recycling of memory blocks in the flash memory devices. However, the FTL does not know the rate of the host write and the volume of data that will ultimately be written for the host request. Nonetheless, the FTL may typically maintain a parameter called recycle-ratio which is defined as the ratio of the amount of recycle writes to the amount of host writes (i.e., number recycle writes/number host writes) to determine the how to best implement the frequency of recycle writes. Determination of the recycle ratio by the FTL without knowledge of the duration/frequency and volume of the host writes, which may occasionally occur in bursts, may lead to the FTL pushing recycle writes based on the determined ratio that does not accurately account for actual conditions resulting in long latency for incoming host writes.

SUMMARY

According to an aspect of the present disclosure, a method of control of a flash translation layer (FTL) for a non-volatile memory (NVM) is disclosed. The method includes receiving a message in the FTL from a host device, where the message includes user recycle ratio information determined in the host device. The user recycle ratio information communicates a desired ratio of a number of host writes to a number of recycle writes to be performed by the FTL. After the user recycle ratio information is received in the FTL, the FTL then determines a target recycle ratio based on the received user recycle ratio information and performs recycling of memory blocks in the NVM based on the determined target recycle ratio. In this manner, the host device is able to exert control over the recycle ratio that is used in the FTL using the message, and allows the recycle ratio to be more adaptive to host write conditions known to the host device, but not to the SSD containing the NVM and FTL.

In another aspect of the present disclosure, an SSD is disclosed including a non-volatile memory (NVM) and a controller communicatively coupled to a host device and the NVM. The controller is configured to receive a message from a host device, the message including user recycle ratio information determined in the host device where the user recycle ratio information communicates a desired ratio of a number of host writes to a number of recycle writes to be performed by the controller. Further, the controller is configured to determine, within the controller, a target recycle ratio based on the received user recycle ratio information, and to perform recycling of memory blocks in the NVM based on the determined target recycle ratio.

In yet another aspect anon-volatile memory (NVM) device is disclosed that includes an apparatus for control of a flash translation layer (FTL) in the NVM device. The apparatus includes means for receiving a message from a host device, the message including user recycle ratio information determined in the host device where the user recycle ratio information communicates a desired ratio of a number of host writes to a number of recycle writes to be performed by the FTL. Furthermore, the apparatus includes means for determining a target recycle ratio based on the received user recycle ratio information, and means for performing recycling of memory blocks in the NVM based on the determined target recycle ratio.

DETAILED DESCRIPTION

The present disclosure provides methods and apparatus for Flash Translation Layer (FTL) control or management where the recycle ratio of the FTL may be set based on information received from a host device. In an aspect, the SSD and the FTL, in particular, is configured to receive information from a host device that includes recycle ratio information, as the host device knows the duration and volume of data to be written to the SSD. The FTL may utilize the recycle ratio information received from the host to determine and set the recycle ratio for the NVM, which allows the host to gain some control over the recycle ratio and the latency for the host writes to the NVM. In an aspect, the present methods and apparatus may be implemented in the Non-Volatile Memory Express (NVMe) standard, where the recycle ratio is exposed by a host to the SSD as a feature in NVMe.

Figure 1:
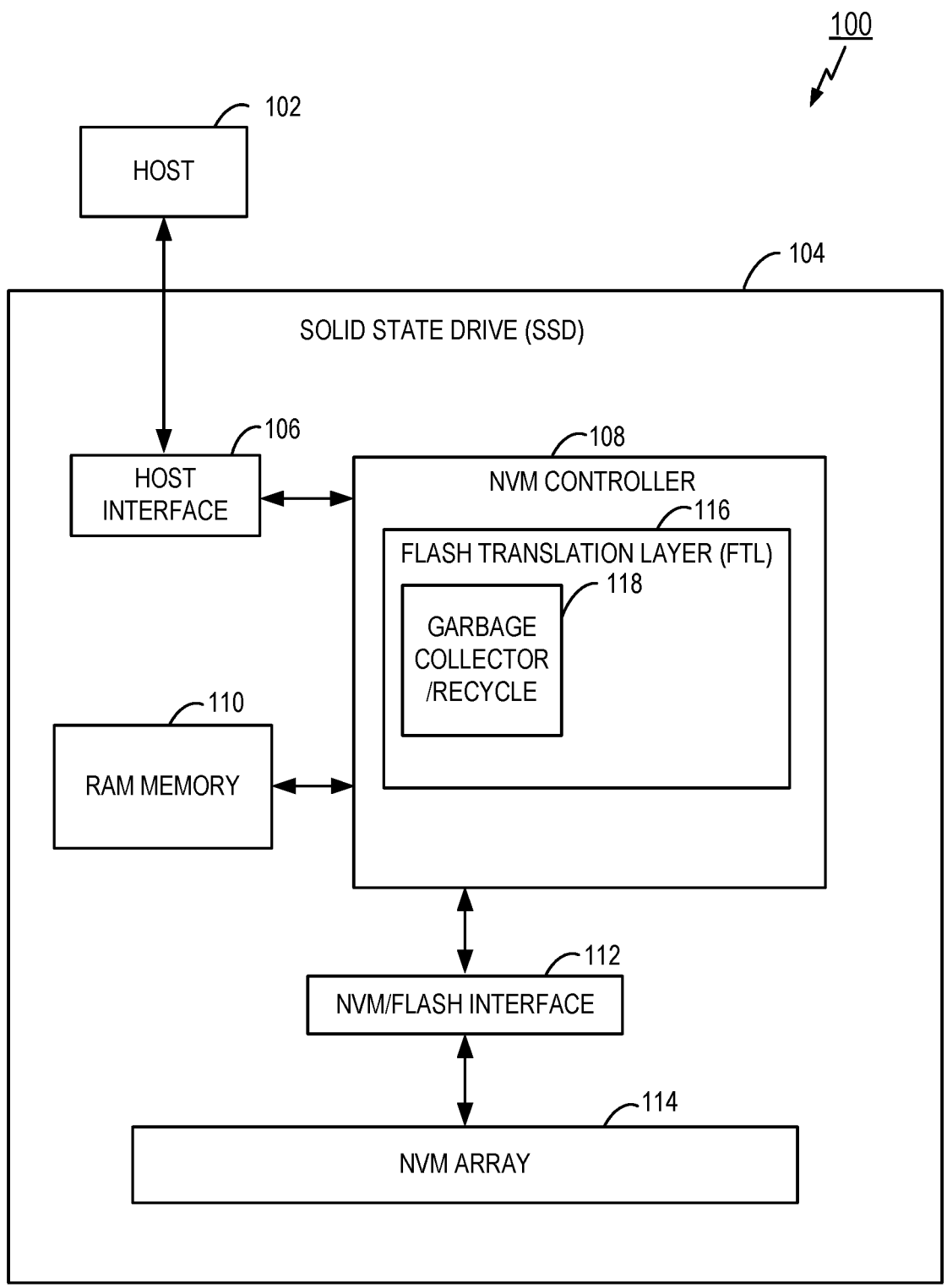
FIG. 1 is a block diagram of an exemplary solid state device (SSD) including an FTL operable in accordance with embodiments of the present disclosure.

Referring to the drawings, FIG. 1 is a block diagram of a system 100 including an exemplary solid state device (SSD) in which the disclosed FTL control or management may be implemented in accordance with aspects of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, a workstation, a server, a personal digital assistant, a digital camera, or a digital phone as merely a few examples.

The SSD storage device 104 includes a host interface 106, a controller 108 (or alternatively, an NVM controller 108), which also includes an FTL 109, a RAM memory or FTL memory 110, a non-volatile memory (NVM) interface 112 (which may also be referred to as a Flash memory interface), and a non-volatile memory (NVM) 114, such as a NAND Flash memory, for example. The host interface 106 is coupled to the controller 108 and facilitates communication between the host 102 and the controller 108. Additionally, the controller 108 is coupled to the RAM memory 110 as well as the NVM 114 via the NVM interface 112. The host interface 106 may be any type of communication interface, such as an NVMe interface, an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system communicatively coupled with the host 102. For example, the host 102 may communicate with the SSD storage device 104 through a wireless communication link.

The controller 108 controls operation of the SSD storage device 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data writes or data reads from the NVM controller 108 via the NVM interface 112 and either stores or reads the data, accordingly. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, or the like.

In a further aspect, the FTL 116 may include a garbage collector/recycle process, module, or algorithm 118 that copies valid data into new or free areas and erases invalid data in physical block locations of the NVM 114 in order to free this invalid memory space. The process of freeing pages or blocks and erasing data includes the process of recycle writes where the block or page is written to because flash memory is write-once type memory where existing data cannot simply be directly overwritten. Rather, a newer version of the data will be written to an available space elsewhere and the older version of the data is then invalidated and considered to be dead. The process of garbage collection recycles the space occupied by the dead data locations. In a particular aspect, the FTL 116 may be configured to determine a recycle ratio as discussed before. The recycle ratio is utilized by the FTL 116 and the garbage collector/recycle process 118 to determine the amount of recycle writes used in freeing memory blocks in the NVM to the amount of host writes being written by the host 102.

Figure 2:
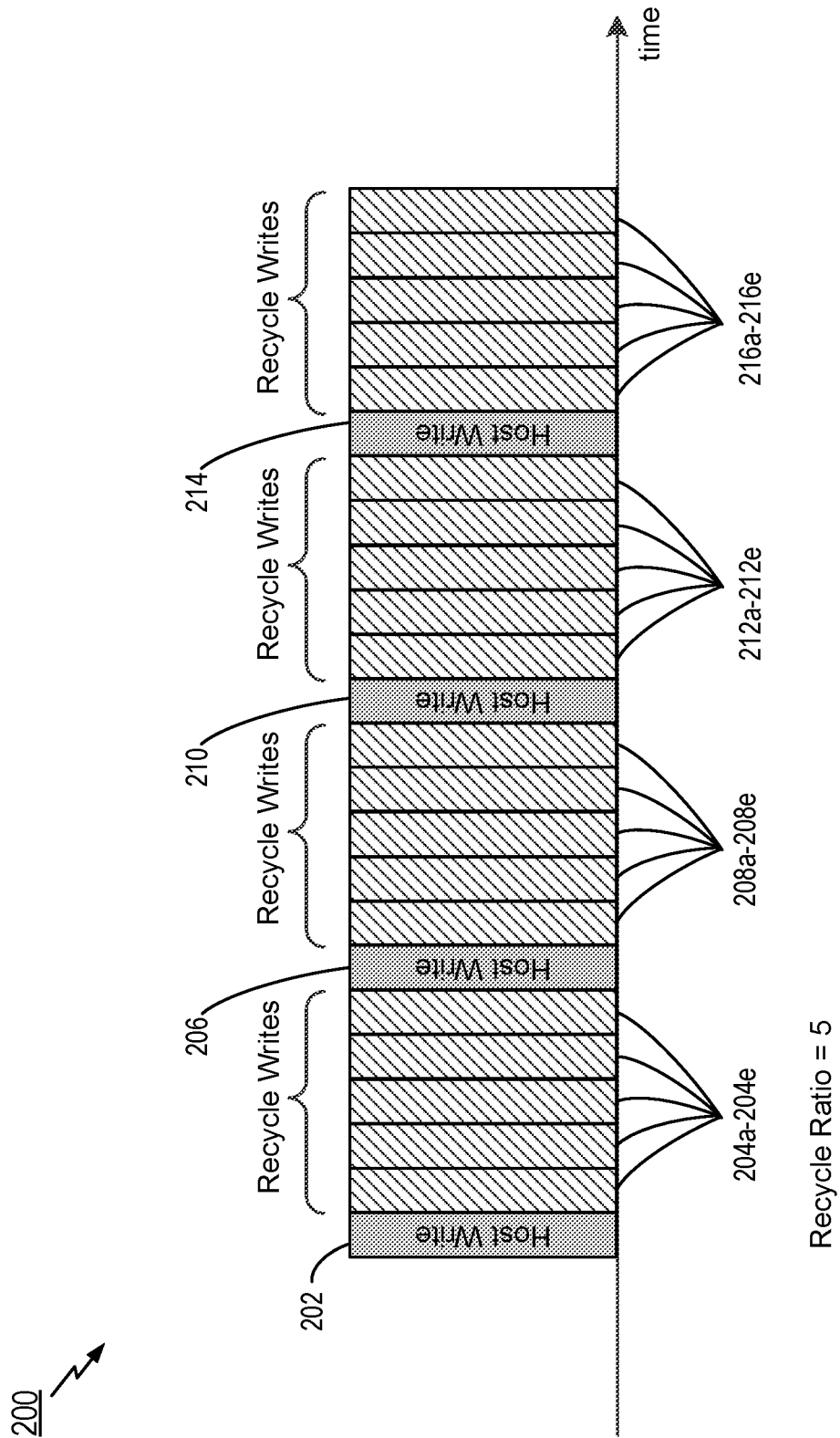
FIG. 2 is a timeline diagram illustrating host and recycle writes according to a recycle ratio that may occur in known SSD systems.

FIG. 2 is a timeline diagram 200 showing the mixing of host and recycle writes to an NVM that may occur in known FTL schemes. Here, when a host device issues a write, then the FTL generates a recycle ratio of the number of recycle writes 202 to the NVM to the number of host writes 204a-204e and so forth as shown by host writes 206, 210, and 214 and respective interjected recycle writes 208a-208e, 212a-212e, and 216a-216e. The example of FIG. 2 shows an example where the recycle ratio is five recycle writes to a single host write (i.e., 5:1 or 5/1 or 5). The recycle writes help the FTL free up blocks. As the amount of spare blocks in the FTL keeps reducing, the recycle-ratio will increase to free up more blocks. Thus, a higher recycle ratio will trigger a higher number of recycle writes. However, host writes are sometimes uneven (i.e., occurring in bursts of higher frequency and/or volume). For example, in the example of FIG. 2, the host may have only four logical pages to write before it stops writing for a long period time. While the host device is aware of this pattern as it is initiating the writes, the FTL in known solutions does not know about the host write pattern. Accordingly, the FTL continues to push the recycle writes based on the host writes, resulting in increased latency.

In a known solution for mitigating the increase in latency, the storage device may be configured to cache the host writes. Once a host write is cached, the write command, from the perspective of the host, appears to be completed. In the background within the SSD, however, the write is done normally with recycle writes, even though the host does not see this latency. Caching host writes, however, may become problematic as the cache size needs to be large enough to cache any burst of host writes. If the host write burst size is large, such as a few hundred megabytes (MBs), it would be difficult to cache all of the write burst. Furthermore, whenever a host write is cached, the cached data needs to be protected against power failures. This increases the cost of a power storage device, such as a capacitor, that is used to maintain the cached data until the data can be flushed from the cache after storage in the NVM.

In order to solve the problem of longer latency that may result from the operation of known methods for determining the recycle ratio, the presently disclosed methods and apparatus provide for communication of the recycle ratio information known in a host device to the FTL in the SSD. Thus, the FTL may receive recycle ratio information from the host in order to set a more accurate recycle ratio based on this communicated information. In a particular example concerning NVMe, the recycle ratio desired or targeted by the host (termed herein as the "user recycle ratio") is communicated to an SSD. Specifically, the user recycle ratio may be configured as a hint, target, or soft command from the host device to the FTL in an SSD to suggest a target recycle ratio that is desired by the host device to be implemented in the SSD. In one example, the user recycle ratio could defined on a scale of 0 to 10 where 0, on the bottom of the scale communicates to the FTL that the host device is suggesting that no recycle writes be performed, whereas a value of 10 means that the host device is suggesting that the FTL perform recycle writes normally, with varying degrees in between on the 0-10 scale. It will be appreciated by those skilled in the art that the scale values and number of gradations is merely exemplary, and that other scales, values, and gradations could be employed without departing from the scope of the presently disclosed methods.

In a further aspect, it is noted that some value in between the ends of the scale could be used to indicate a normal or desired recycle ratio in the FTL, where values above that value would indicate that the FTL may set an even higher recycle ratio to allow the FTL to catch up with recycle writes for those previously suppressed recycle writes that occurred when a lower recycle ratio was set. It is also noted that the integer values on the scale may also correlate to a particular recycle ratio, although the scale is not limited to such. For example, a value of 5 could indicate a recycle ratio of five recycle writes to one host write, or a value of 10 could indicate a recycle ratio of ten recycle writes to one host write, and so forth. Additionally, in another aspect, the user recycle ratio could be configured to be a hard command that allows the host device to temporarily gain control of the recycle ratio in the FTL in other implementations.

In an aspect, the user recycle ratio may be configured as a set feature identifier message or command that is communicated from the host device to the SSD in an example for use of the methodology in NVMe. Additionally, this information may be dynamic or intermittently changed in that the recycle ratio may be changed dependent on whether the host device has a burst of writes necessitating little or no recycle writes or a more sporadic number of writes allowing a normal recycle ratio to be effectuated, as examples.

Figure 3:
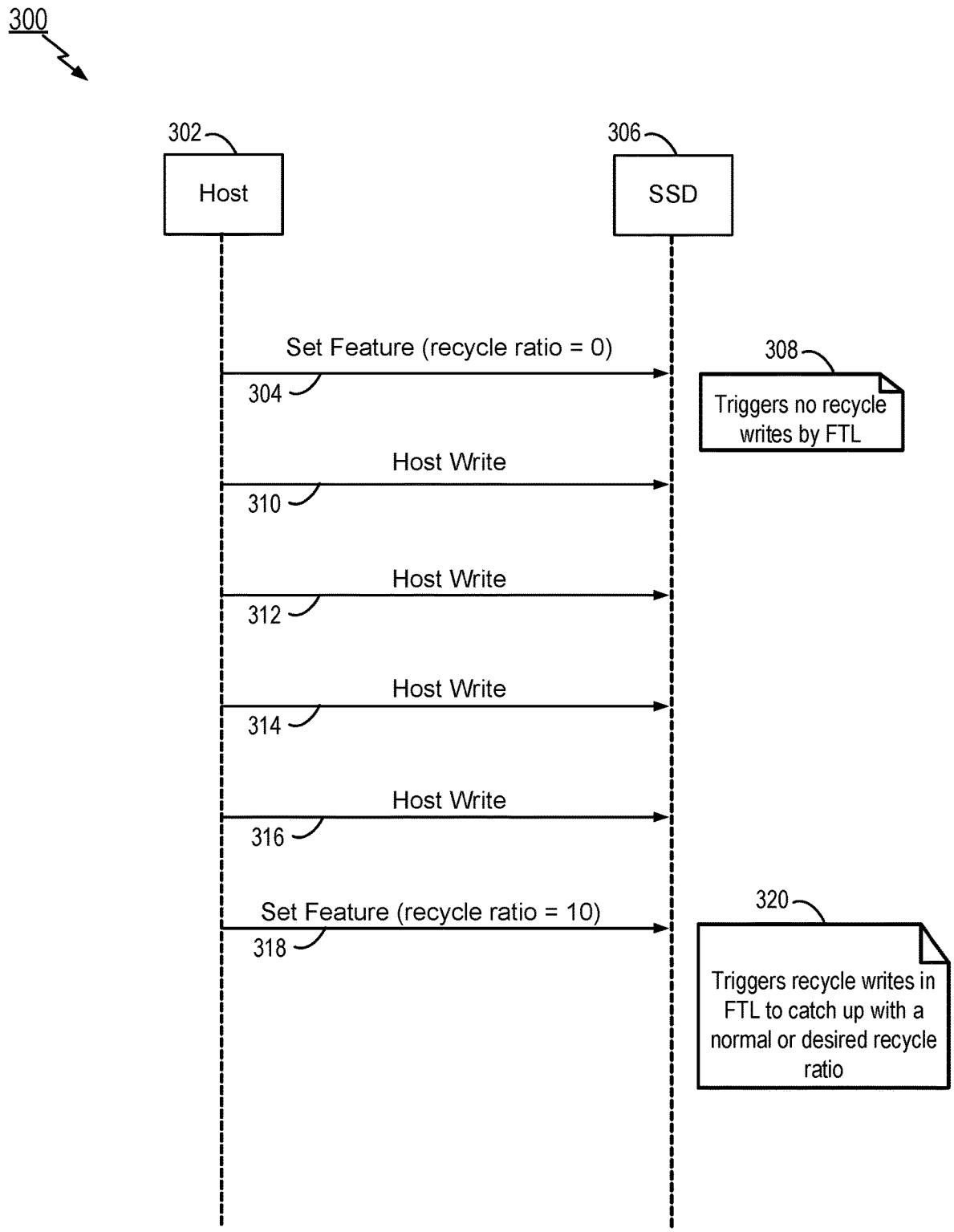
FIG. 3 is a ladder diagram of a process for implementing determination and setting of a recycle ratio in accordance with the present disclosure.

FIG. 3 illustrates an exemplary ladder diagram 300 showing the issuance of messages or commands and write requests over time from a host device to an SSD (and an FTL in particular) in accordance with aspects of the present disclosure. As illustrated, a host device 302 first issues set feature message 304 to an SSD 306. In one aspect in connection with the apparatus of FIG. 1, the message 304 is sent from a host device, such as host 102, to a controller 108 and FTL 116 via a host interface 106. In the example illustrated in FIG. 3, the set feature message 304 communicates that the user recycle ratio is zero, thus communicating to the FTL that no recycle writes are desired as the host device knows that a number of host writes will be forthcoming. In an aspect, the FTL may respond to message 304 by calculating and setting the recycle ratio to zero as illustrated by process block 308.

After the host communicates the set feature message 304, a series or burst of writes 310, 312, 314, and 316 are issued from the host 302 to the SSD 306. It is noted that, for the sake of simplicity of illustration of the presently disclosed concepts, the ladder diagram 300 does not show write completion messaging from the SSD 306 back to the host 304, even though such messaging will occur in normal host write operations.

After the burst of writes 310, 312, 314, 316 are completed by the host 302, the host 302 will then issue another set feature message 318 communicating another desired user recycle ratio. In the example of FIG. 3, a user recycle ratio value of 10 is shown, which communicates to the FTL in the SSD 306 to set a higher recycle ratio that allows for a normal recycle ratio, in one example, or to achieve a catch up of recycle writes in another example. In the latter example, FIG. 3 illustrates that the set feature message 318 with a value of 10 triggers recycle writes in the FTL to catch up with a normal or desired recycle ratio as shown in block 320.

It is noted that in aspects of the presently disclosed methodology, the set feature messages with the host or user's desired recycle ratio (i.e., the "user recycle ratio") are again providing hints or suggestions to the FTL of an optimal recycle ratio based on the information of present and upcoming writes known to the host. Ultimately, however, the FTL has control over setting the actual recycle ratio that will be effectuated in the SSD contingent on conditions within the NVM known to the FTL, such as the available number of spare or free blocks or pages. Thus, in an aspect, the presently disclosed methods and apparatus further include the calculation in the FTL of the actual target recycle ratio that will be employed in the SSD that is calculated based on the user recycle ratio received in the set feature message from the host device.

Figure 4:
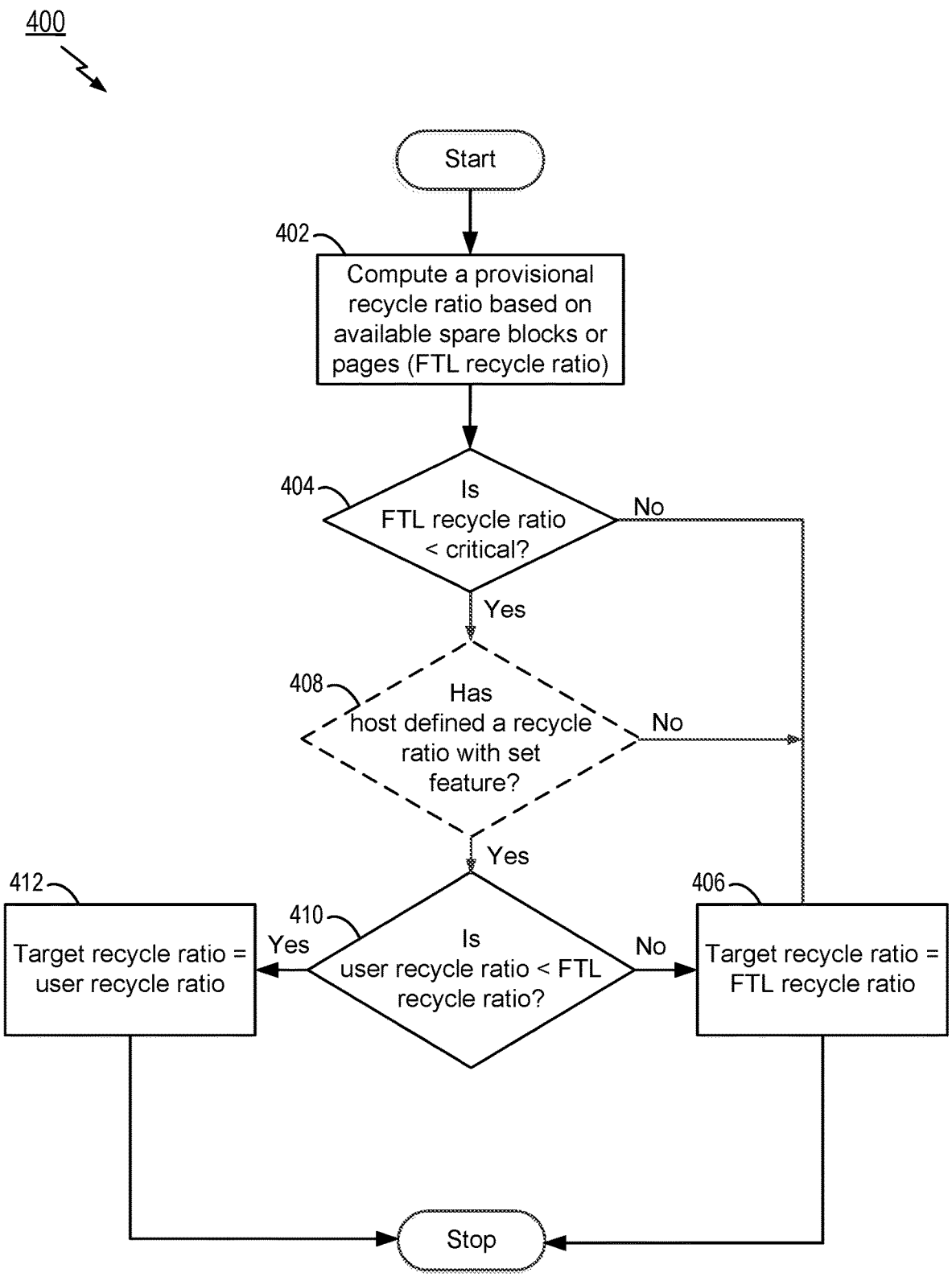
FIG. 4 illustrates a flow diagram of an exemplary method for setting or determining a target recycle ratio in an SSD in accordance with aspects of the present disclosure.

Accordingly, FIG. 4 illustrates a method 400 employed within an FTL to determine or calculate the target recycle ratio that accounts for both the receipt of a user recycle ratio from a host device, as well as conditions within the NVM. As shown in block 402, the FTL first calculates a provisional or temporary recycle ratio based on available spare blocks or pages. This provisional recycle ratio is termed herein as the "FTL recycle ratio." After calculation of the FTL recycle ratio, the method 400 includes determining if the amount of available memory space (e.g., the number of spare blocks or pages) in the NVM is less than a critical threshold as shown at decision block 404. If yes, then flow proceeds to block 406 where the target recycle ratio that will be followed by the FTL is set equal to the calculated FTL recycle ratio as this recycle ratio will be needed as the amount of spare blocks or pages is critical and recycling needs to be performed at a high enough frequency to ensure there will be blocks available to store host writes. It is noted that even if the host device has sent a user recycle ratio in a set feature message, in this instance the user recycle ratio will be ignored as the available space is critical. Of further note, in aspect the critical threshold is configurable within an SSD. In one example, the critical threshold may be defined as a threshold of free spare blocks, below which the recycle writes are given higher priority than the host writes. Thus, until the recycle threshold exceeds the critical recycle threshold indicating that enough blocks have been freed up, the host writes will be put on hold.

If the FTL recycle ratio is not critical, as determined at block 404, flow proceeds to decision block 408 to determine if the host device has defined a user recycle ratio with the set feature message. If not, flow proceeds to block 406 where the target recycle ratio is set to the calculated FTL recycle ratio as the host has not communicated a user recycle ratio. On the other hand, if the FTL has received a user recycle ratio flow proceeds to decision block 410. It is noted that if the set feature message is a matter of form or is standardly issued, the process of block 408 may become optional as indicated by the use of dashed lines as the user recycle ratio will always be received.

At decision block 410, a determination is made by the FTL whether the received user recycle ratio is less than the computed FTL. If not, flow proceeds to block 406 where the computed FTL recycle ratio is set as the target recycle ratio by which the FTL will operate. Alternatively, the user recycle ratio is less than the computed FTL recycle ratio, flow will proceed to block 412 where the target recycle ratio is set equal to the received user recycle ratio, thereby allowing the host device to influence and exert control over the FTL's target recycle ratio. In either case of block 406 or 412, the FTL will then issue recycle writes based on the determined target recycle ratio. In the case of block 412, this case affords the FTL to better accommodate bursty host write scenarios, for example, and to reduce host write latencies.

While the processes of method 400 are shown terminating after the execution of processes 406 or 412, it is noted that method 400 may be repeated periodically to account for subsequently issued set feature messages from the host, which communicate new or updated user recycle ratios, such as in the instance of message 318 shown in FIG. 3. In another alternative aspect, the processes and determination of method 400 could be triggered upon receipt of a set feature message from the host device that communicates the user recycle ratio.

Figure 5:
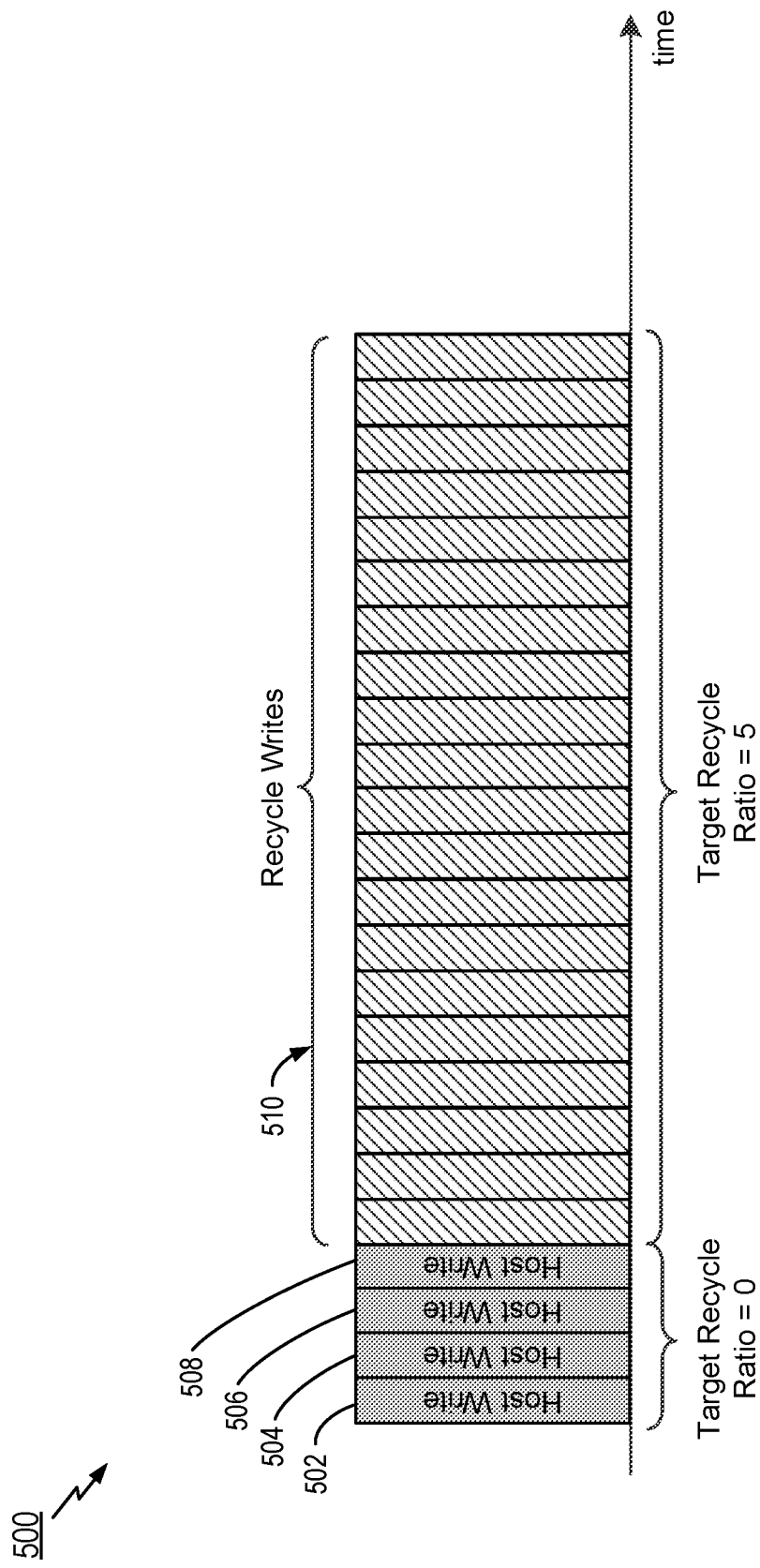
FIG. 5 is a timeline diagram illustrating host and recycle writes occurring in accordance with setting recycle ratios based on the presently disclosed methods and apparatus.

FIG. 5 is a diagram 500 illustrating a timeline of host and recycle writes occurring in accordance with setting target recycle ratios based on the presently disclosed methods and apparatus. As may be seen in FIG. 5, in an instance where the user recycle ratio results in the FTL setting the recycle ratio to zero similar to message 304 and block 306 in FIG. 3, no recycle writes will be performed by the FTL. Accordingly, in the illustrated example a series of four host writes (which may constitute a burst of writes) received from the host device will be written sequentially as shown by host writes 502, 504, 506, and 508, without any recycle writes interjected there between as the target recycle ratio is zero. Accordingly, it may be seen that the host writes 502, 504, 506, and 508 in the example of FIG. 5 are completed much ahead of the timing for host writes 202, 206, 210, and 214 shown for the recycle ratio settings present in the timeline of FIG. 2, with an attendant reduction is host write latency. After the host writes are sent, the FTL may then receive an updated user recycle ratio from the host device to set the target recycle ratio to a higher value, such as 5 as shown in the example of FIG. 5. The recycle writes 510 that need to occur over the same time period as was shown in FIG. 2 are then performed after the host writes (e.g., 20 recycle writes that correspond to five recycle writes for each of the four host writes to achieve an ultimate 5:1 recycle ratio). In another aspect, the FTL or SSD controller may be configured to revert back to the FTL recycle ratio after a predetermined time period (e.g., "n" units of time) for which the host device does not provide a user recycle ratio or irrespective of the user recycle ratio. In yet a further aspect, if the FTL reverts to the FTL recycle ratio, the host device may then set the recycle ratio again that is set for a next duration of "n" units of time.

Figure 6:
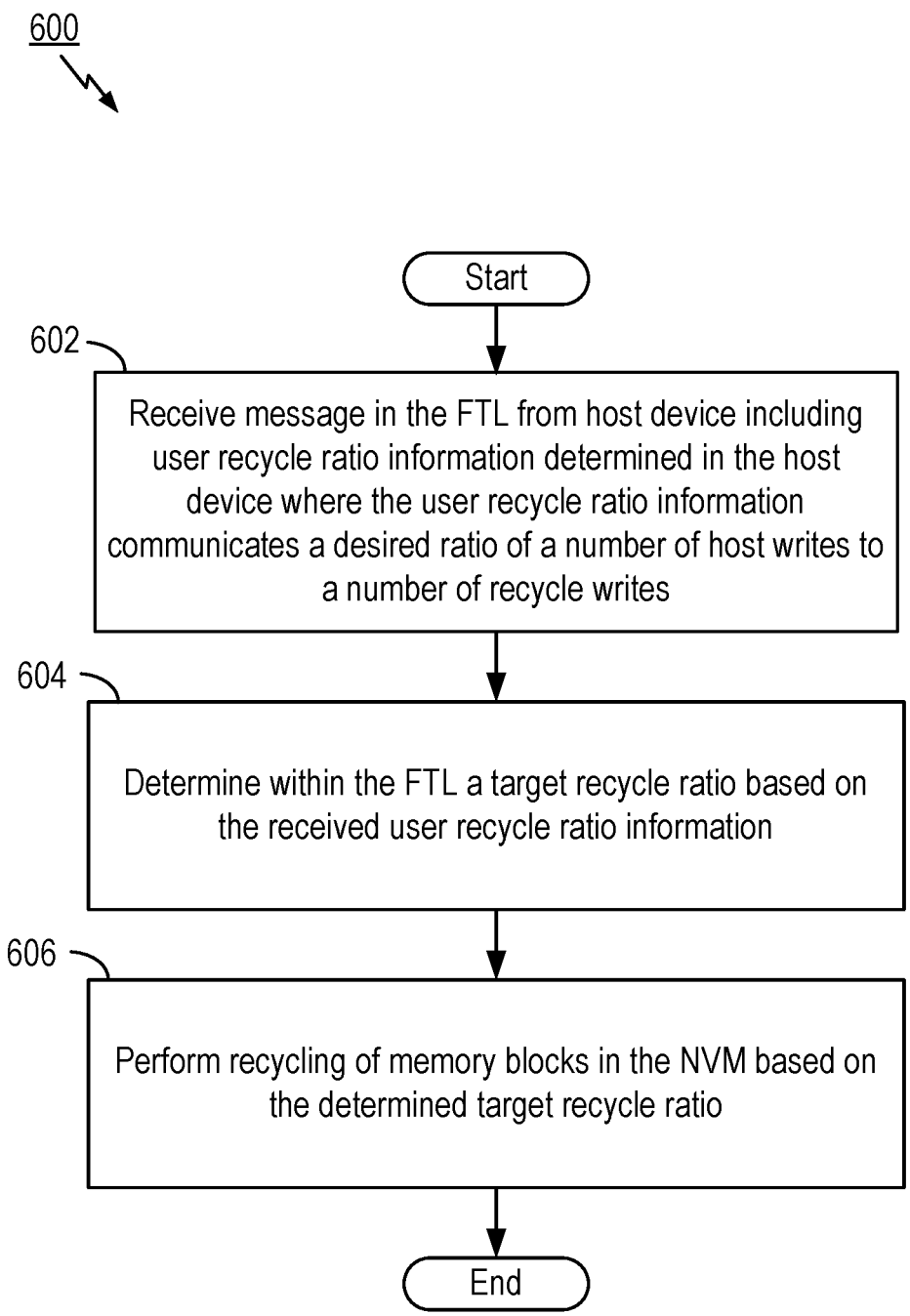
FIG. 6 illustrates a flow diagram of another exemplary method for setting a recycle ratio in an SSD in accordance with aspects of the present disclosure.

FIG. 6 illustrates yet another method 600 for control of an FTL recycle ratio from a host device. Method 600 includes receiving a message in the FTL from a host device, where the message includes user recycle ratio information determined in the host device with the user recycle ratio information communicating at least a desired ratio of a number of host writes to a number of recycle writes to be performed by the FTL (e.g., a user recycle ratio as discussed above) as illustrated in block 602. The user recycle ratio information is defined on a scale of integer values having a range of values from zero to N, where zero on the scale represents a recycle ratio of zero (i.e., no recycle writes are to be performed) and the values in the scale greater than 0 up to N represent varying degrees of a range of recycle ratios. In one aspect, N represents a normal recycle ratio value for the particular FTL. In other aspects, the value N may represent an increased recycle ratio above a normal recycle ratio value, which will be some value less than N. In further aspects, the user recycle ratio information is set at a value of 0 during a first time period in which a burst of host writes occurs as may be determined by the host device and then the user recycle ratio information is set at a value greater than 0 during a second time period after the first time period to allow the FTL to execute recycle writes, such as was illustrated in the example of FIG. 5. In one example, the processes of block 602 may be accomplished by an FTL, such as FTL 116 in FIG. 1. In still other aspects, the processes of block 602 may be effected by an FTL in conjunction with a host device and a host interface (e.g., host 102 and interface 106 in FIG. 1).

Next, method 600 includes determining, within the FTL, a target recycle ratio based on the received user recycle ratio information as shown in block 604. As described before, the target recycle ratio may be a suggested recycle ratio that the FTL is trying to maintain, but this may overridden by concerns such as the NVM having less than a critical number of spare blocks or pages as this may affect the ability to handle host writes to the NVM, for example. In a particular aspect in regard to the processes of block 604, these processes may further include determining whether memory space in the NVM is less than a predetermined critical value, and the performing recycling of the memory blocks based on a calculated recycle ratio calculated by the FTL without regard to the received user recycle ratio information received from the host device when the memory space in the NVM is less than the predetermined critical value. In an example, the processes of block 604 may be accomplished by an FTL, such as FTL 116 in FIG. 1.

Moreover, method 600 includes performing recycling of memory blocks in the NVM based on the determined target recycle ratio, as shown in block 606. In an example, the processes of block 606 may be accomplished by an FTL, such as FTL 116 in FIG. 1, as well as the particular garbage collection/recycle function 118 in the FTL.

In other aspects, method 600 may further include calculating an FTL recycle ratio within the FTL similar to process 402 in FIG. 4, as well as determining a user recycle ratio based on the received user recycle ratio information. Further, the method 600 may include comparing the FTL recycle ratio with the user recycle ratio and then setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio, similar to processes 406, 410, and 412 in FIG. 4.

In yet further aspects, method 600 may include receiving a sequential plurality of messages in the FTL from the host device, where each of the plurality of messages is received in a time sequence one after the other and includes respective user recycle ratio information determined in the host device based on host writes to be performed. It is noted that this sequential sending of messages by the host device could be implemented where user recycle information is sent with each host write or alternatively with every n number of host writes. Thus, the steps in method 600 may be performed for every host write, or alternatively for every n number of host writes. Correlatively, method 600 may also include determining for each of the plurality of received messages a current target recycle ratio based on the respective user recycle ratio information within the FTL. Thus, this current target recycle ratio is determined and updated for each set feature message received from the host device and recycling of memory blocks in the NVM will be performed based on the determined current target recycle ratio.

According to another aspect, a non-volatile memory (NVM) device including an apparatus for control a flash translation layer (FTL) in the NVM device is disclosed. The apparatus may include means for receiving a message from a host device, the message including user recycle ratio information determined in the host device where the user recycle ratio information communicates a desired ratio of a number of host writes to a number of recycle writes to be performed by the FTL. This means may be implemented by a structure including controller 108 and FTL 116, or equivalents thereof. Additionally, this means may be implemented including host interface 106.

Further, the apparatus for control a flash translation layer (FTL) in the NVM device may include means for determining a target recycle ratio based on the received user recycle ratio information. In aspects, this means may be implemented by structure including FTL 116, or equivalents thereof. Still further, the apparatus may include means for performing recycling of memory blocks in the NVM based on the determined target recycle ratio. This means for performing recycling may be implemented by a structure including FTL 116 and garbage collection/recycling block 118, or equivalents thereof.

Figure 7:
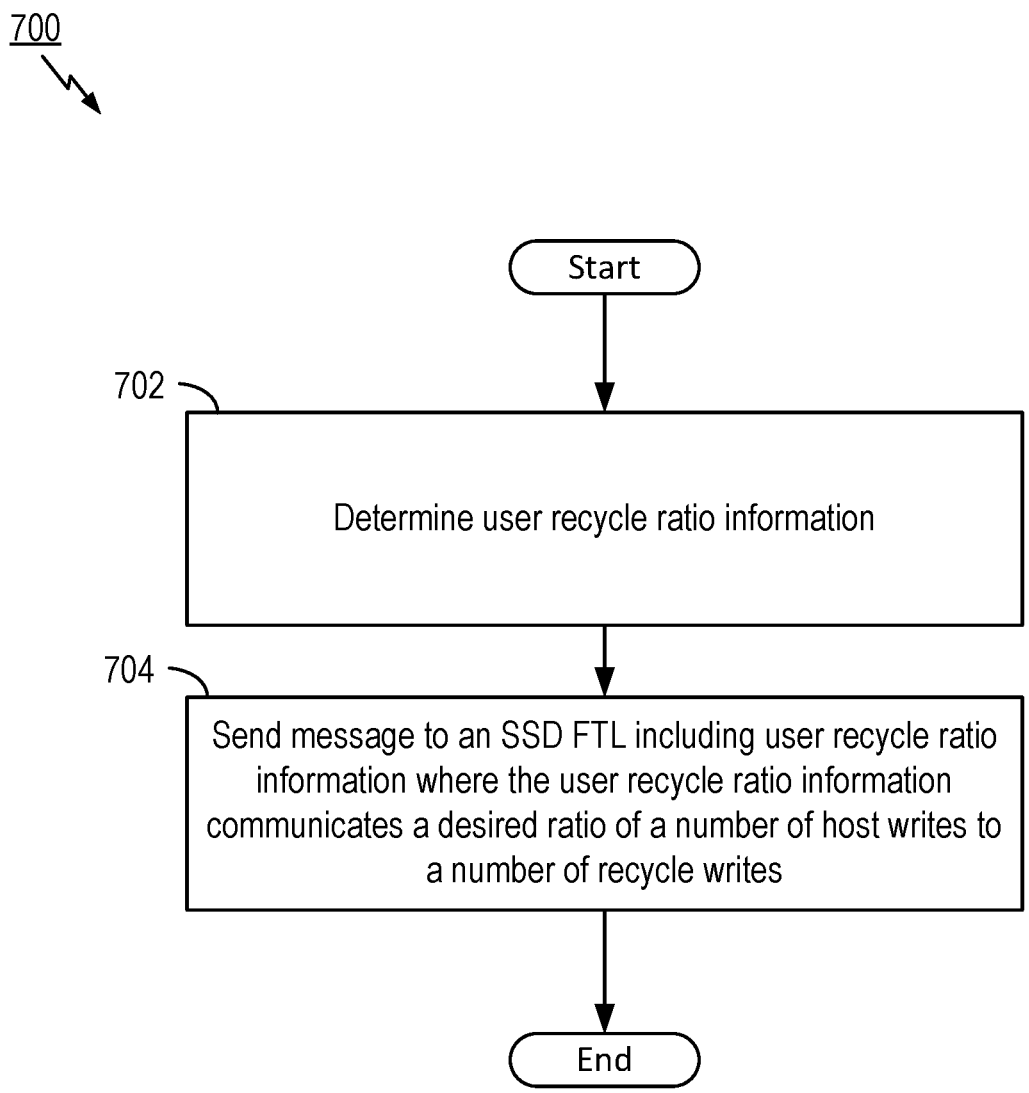
FIG. 7 illustrates a flow diagram of yet another exemplary method for setting a recycle ratio in an SSD from a host device in accordance with aspects of the present disclosure.

FIG. 7 illustrates a method 700 for controlling the recycle ratio in an SSD from a host device. The method 700 includes determining within host device user recycle ratio information desired as shown in block 702. This information may be determined based on, among other things, a predictive workload where the host device is capable of identifying and predicting the level of bursts for the host writes. Method 700 further includes then sending a message to an SSD FTL where the message includes the determined user recycle ratio information where the user recycle ratio information communicates a desired ratio of a number of host writes to a number of recycle writes to the FTL as shown in block 704. In further aspects, the recycle ratio information is configured to allow the host device to exert influence or control over the SSD FTL in order to control the recycle ratio in the SSD, as was discussed herein.

As will be appreciated by those skilled in the art, the presently disclosed methods and apparatus provide a host device some degree of control over the recycle ratio utilized in the FTL, thereby allowing for potential reduction in the latency for host writes. In certain aspects, the host device may be configured to determine the set feature message and the recycle ratio, in particular, based on any one of various techniques to determine the ratio, such as technologies based on predictive workload where a host device is capable of identifying and predicting the level of bursts for the host writes. Also, while the present disclosure has provided examples in the context of an NVMe set feature command, the presently disclosed concepts may be applied to other storage device interfaces such as Serial Advanced Technology Attachment (SATA) and Serial Attached SCSI (SAS) interfaces for use in the internal recycle management of NVM devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of control of a flash translation layer (FTL) for a non-volatile memory (NVM), the method comprising:
   receiving a message in the FTL from a host device, the message including user recycle ratio information determined in the host device where the user recycle ratio information communicates a ratio of a number of host writes to a number of recycle writes to be performed by the FTL, and where the ratio is set to a first value to indicate that no recycle writes are to occur during a host burst write and set to a second value to indicate that at least some recycle writes are to occur after the host burst write;
   determining, within the FTL, a target recycle ratio based on the received user recycle ratio information; and performing recycling of memory blocks in the NVM based on the determined target recycle ratio.

2. The method of claim 1, wherein the user recycle ratio information is defined on a scale of 0 to N values where the value 0 represents a recycle ratio where no recycle writes occur and the values in the scale greater than 0 up to N represent varying degrees of a range of recycle ratios where at least some recycle writes occur.

3. The method of claim 2, wherein the user recycle ratio information is set at a value of 0 during a first time period in which a burst of host writes occurs and the user recycle ratio information is set at a value greater than 0 during a second time period after the first time period to allow the FTL to execute recycle writes.

4. The method of claim 1, further comprising:
determining whether memory space in the NVM is less than a predetermined critical value; and
performing recycling of the memory blocks based on a calculated FTL user recycle ratio calculated by the FTL without regard to the received user recycle ratio information received from the host device when the memory space in the NVM is less than the predetermined critical value.

5. The method of claim 1, further comprising:
calculating within the FTL an FTL recycle ratio;
determining a user recycle ratio based on the received user recycle ratio information;
comparing the FTL recycle ratio with the user recycle ratio; and
setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio.

6. The method of claim 1, further comprising:
receiving a sequential plurality of messages in the FTL from the host device, each of the plurality of messages including respective user recycle ratio information determined in the host device based on host writes to be performed;
determining, within the FTL, for each of the plurality of received messages a current target recycle ratio based on the respective user recycle ratio information; and
performing recycling of memory blocks in the NVM based on the determined current target recycle ratio.

7. The method of claim 1, wherein the message comprises a set feature command according to the NVMe standard.

8. The method of claim 1, wherein the NVM is operable according to at least one of NVMe, SAS or SATA interfaces.

9. A solid state drive (SSD) comprising:
a non-volatile memory (NVM); and
a controller communicatively coupled to a host device and the NVM, wherein the controller is configured to:
receive a message from a host device, the message including user recycle ratio information determined in the host device where the user recycle ratio information communicates a ratio of a number of host writes to a number of recycle writes to be performed by the controller, and where the ratio is set to a first value to indicate that no recycle writes are to occur during a host burst write and set to a second value to indicate that at least some recycle writes are to occur after the host burst write;
determine, within the controller, a target recycle ratio based on the received user recycle ratio information; and
recycle memory blocks in the NVM based on the target recycle ratio.

10. The SSD of claim 9, wherein the user recycle ratio information is defined on a scale of 0 to N values where the value 0 represents a recycle ratio where no recycle writes occur and the values in the scale greater than 0 up to N represent varying degrees of a range of recycle ratios where recycle writes occur.

11. The SSD of claim 10, wherein the user recycle ratio information is set at a value of 0 during a first time period in which a burst of host writes occurs and the user recycle ratio information is set at a value greater than 0 during a second time period after the first time period to allow the controller to execute recycle writes.

12. The SSD of claim 9, wherein the controller is further configured to:
determine whether memory space in the NVM is less than a predetermined critical value; and
performing recycling of the memory blocks based on a calculated recycle ratio calculated by the controller without regard to the received user recycle ratio information received from the host device when the memory space in the NVM is less than the predetermined critical value.

13. The SSD of claim 9, wherein the controller is further configured to:
calculate a flash translation layer (FTL) recycle ratio;
determine a user recycle ratio based on the received user recycle ratio information;
compare the FTL recycle ratio with the user recycle ratio; and
set the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio.

14. The SSD of claim 9, wherein the controller is further configured to:
receive a sequential plurality of messages in the FTL from the host device, each of the plurality of messages including respective user recycle ratio information determined in the host device based on host writes to be performed;
determine, within the FTL, for each of the plurality of received messages a current target recycle ratio based on the respective user recycle ratio information; and
perform recycling of memory blocks in the NVM based on the determined current target recycle ratio.

15. The SSD of claim 9, wherein the message comprises a set feature command according to the NVMe standard.

16. The SSD of claim 9, wherein the NVM is operable according to at least one of NVMe, SAS or SATA interfaces.

17. A non-volatile memory (NVM) device including an apparatus for control of a flash translation layer (FTL) in the NVM device, the apparatus comprising:
means for receiving a message from a host device, the message including user recycle ratio information determined in the host device where the user recycle ratio information communicates a ratio of a number of host writes to a number of recycle writes to be performed by the FTL, and where the ratio is set to a first value to indicate that no recycle writes are to occur during a host burst write and set to a second value to indicate that at least some recycle writes are to occur after the host burst write;
means for determining a target recycle ratio based on the received user recycle ratio information; and means for recycling memory blocks in the NVM based on the target recycle ratio.

18. The apparatus of claim 17, wherein the user recycle ratio information is defined on a scale of 0 to N values where the value 0 represents a recycle ratio where no recycle writes occur and the values in the scale greater than 0 up to N represent varying degrees of a range of recycle ratios where recycle writes occur.

19. The apparatus of claim 18, wherein the user recycle ratio information is set at a value of 0 during a first time period in which a burst of host writes occurs and the user recycle ratio information is set at a value greater than 0 during a second time period after the first time period to allow the FTL to execute recycle writes.

20. The apparatus of claim 17, further comprising:
means for determining whether memory space in the NVM is less than a predetermined critical value; and
means for performing recycling of the memory blocks based on a calculated recycle ratio calculated by the FTL without regard to the received user recycle ratio information received from the host device when the memory space in the NVM is less than the predetermined critical value.

21. The apparatus of claim 17, further comprising:
means for calculating within an FTL recycle ratio;
means for determining a user recycle ratio based on the received user recycle ratio information;
means for comparing the FTL recycle ratio with the user recycle ratio; and
means for setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio.

22. The apparatus of claim 17, further comprising:
means for receiving a sequential plurality of messages from the host device, each of the plurality of messages including respective user recycle ratio information determined in the host device based on host writes to be performed;
means for determining for each of the plurality of received messages a current target recycle ratio based on the respective user recycle ratio information; and
means for performing recycling of memory blocks in the NVM based on the determined current target recycle ratio.

23. The apparatus of claim 17, wherein the message comprises a set feature command according to the NVMe standard.

24. The apparatus of claim 17, wherein the NVM is operable according to at least one of NVMe, SAS or SATA interfaces.

25. A method of control of a flash translation layer (FTL) for a non-volatile memory (NVM), the method comprising:
receiving a message in the FTL from a host device, the message including user recycle ratio information determined in the host device where the user recycle ratio information communicates a ratio of a number of host writes to a number of recycle writes to be performed by the FTL;
determining, within the FTL, a target recycle ratio based on the received user recycle ratio information by calculating within the FTL an FTL recycle ratio,
determining a user recycle ratio based on the received user recycle ratio information,
comparing the FTL recycle ratio with the user recycle ratio, and
setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio; and
performing recycling of memory blocks in the NVM based on the determined target recycle ratio.

26. A solid state drive (SSD) comprising:
a non-volatile memory (NVM); and
a controller communicatively coupled to a host device and the NVM, wherein the controller is configured to:
receive a message from a host device, the message including user recycle ratio information determined in the host device where the user recycle ratio information communicates a ratio of a number of host writes to a number of recycle writes to be performed by the controller;
determine, within the controller, a target recycle ratio based on the received user recycle ratio information by
calculating a flash translation layer (FTL) recycle ratio,
determining a user recycle ratio based on the received user recycle ratio information,
comparing the FTL recycle ratio with the user recycle ratio, and
setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio; and
perform recycling of memory blocks in the NVM based on the determined target recycle ratio.

27. A non-volatile memory (NVM) device including an apparatus for control of a flash translation layer (FTL) in the NVM device, the apparatus comprising:
means for receiving a message from a host device, the message including user recycle ratio information determined in the host device where the user recycle ratio information communicates a ratio of a number of host writes to a number of recycle writes to be performed by the FTL;
means for determining a target recycle ratio based on the received user recycle ratio information, the means for determining the target recycle ratio including
means for calculating within an FTL recycle ratio,
means for determining a user recycle ratio based on the received user recycle ratio information,
means for comparing the FTL recycle ratio with the user recycle ratio, and
means for setting the target recycle ratio equal to the FTL recycle ratio when the FTL recycle ratio is less than the user recycle ratio and setting the target recycle ratio equal to the user recycle ratio when the FTL recycle ratio is greater than or equal to the user recycle ratio; and
means for performing recycling of memory blocks in the NVM based on the determined target recycle ratio.

* * * * *